March 16, 1937.   E. H. HAMMOND ET AL   2,073,838
PNEUMATIC CONTROL SYSTEM
Filed April 26, 1935   2 Sheets-Sheet 1

INVENTOR
Elmer H. Hammond
BY Rudolf Beck
Darby & Darby
ATTORNEYS.

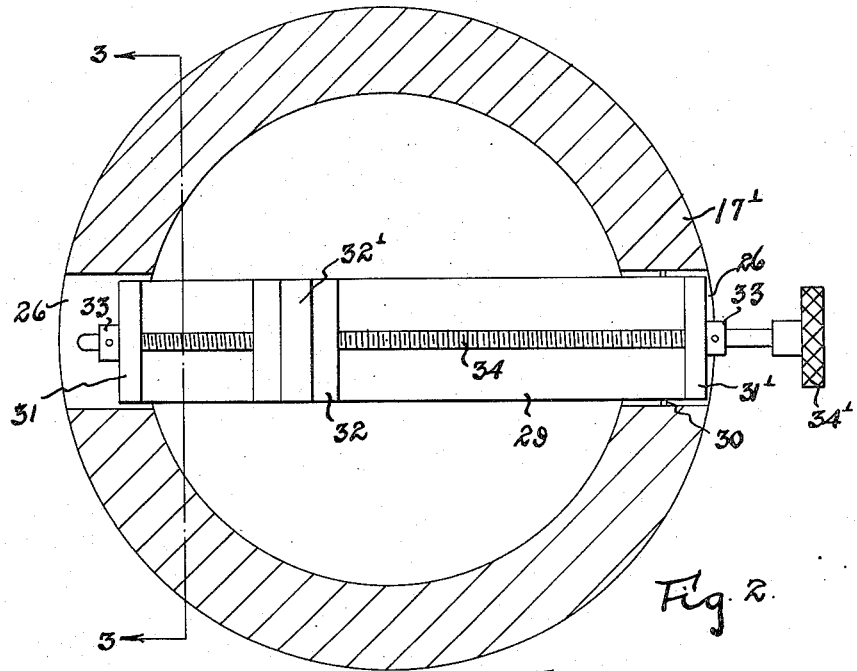
Fig. 2.
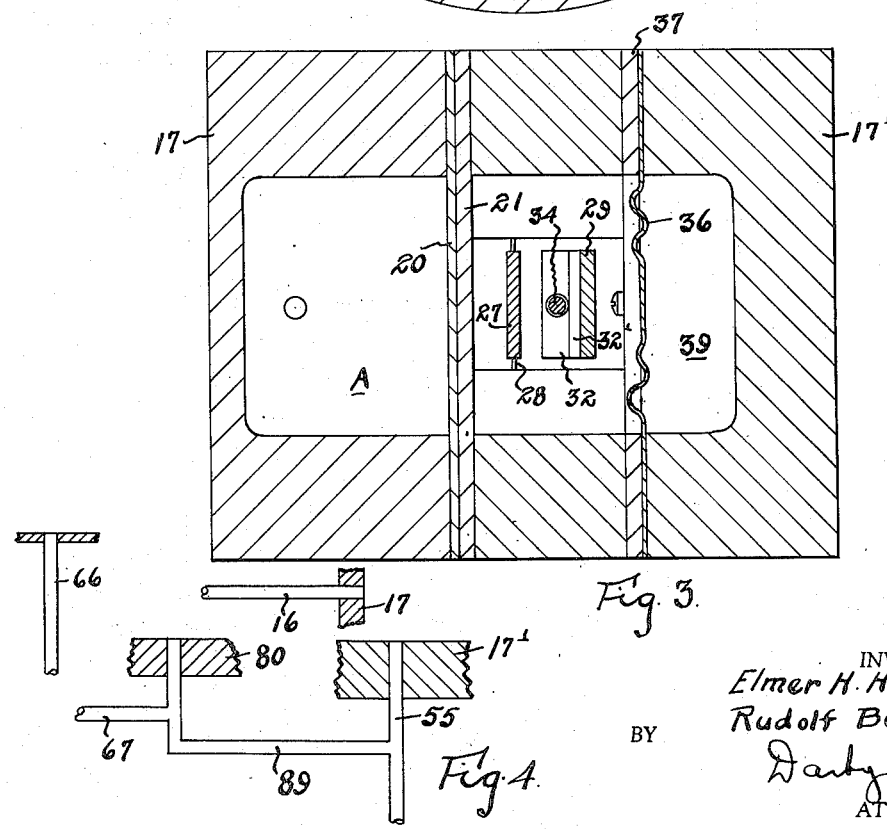
Fig. 3.
Fig. 4.
INVENTOR.
Elmer H. Hammond
Rudolf Beck
BY
ATTORNEYS.

Patented Mar. 16, 1937

2,073,838

UNITED STATES PATENT OFFICE 2,073,838

PNEUMATIC CONTROL SYSTEM

Elmer H. Hammond, Southport, and Rudolf Beck, Bridgeport, Conn., assignors to Consolidated Ashcroft Hancock Company, Inc., Bridgeport, Conn., a corporation of Delaware Application April 26, 1935, Serial No. 18,382

10 Claims. (Cl. 236—82)

This invention relates to control apparatus of the pneumatic type which is actuated by a deviation of the temperature and pressure in heat exchange apparatus from a desired control point to control a motive device which in turn regulates the flow of heating or cooling medium to the heat exchange apparatus to correct that deviation.

The many objects of this invention which are successfully secured by means of the apparatus herein disclosed will be more apparent in connection with a description of the apparatus and its operation, and need not therefore be referred to generally at this point.

This invention resides substantially in the combination, construction, arrangement and relative location of parts, all as will be described in detail below.

In the drawings,

Figure 2 is a cross sectional view taken on the line 2—2 of Figure 1.

Figure 3 is a cross sectional view taken on the line 3—3 of Figure 2.

Figure 4 is a diagrammatic view showing a modified form of connection for the apparatus.

Figure 1:
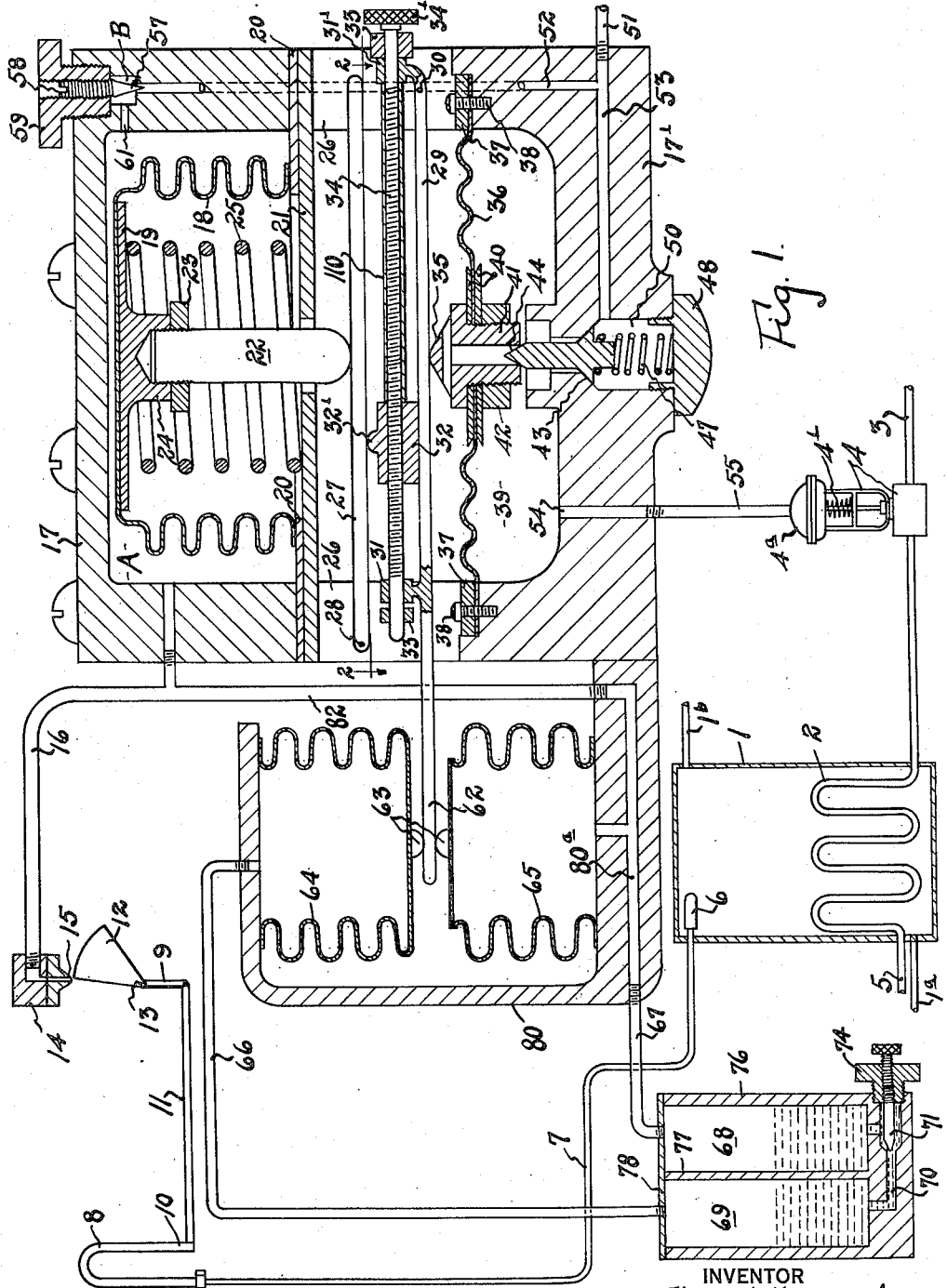
Figure 1 shows a complete system in accordance with this invention showing most of the parts thereof in cross section. It is to be noted that no attention has been paid in this figure to proportions.

This invention relates generally to pneumatic control apparatus of the supply and waste type where air is allowed to bleed through a small nozzle into the atmosphere, which nozzle is covered and uncovered by means of a movable member. This movable member is mechanically interconnected with a thermostatic apparatus subjected to the temperature conditions within the heat exchange apparatus under control. The variations in the air pressure caused by covering and uncovering the nozzle are in turn employed to control a relay which in turn controls a fluid pressure operated motive valve for varying the flow of heating or cooling medium to the heat exchange apparatus. The purpose of such a system is to maintain the temperature and/or pressure conditions within the heat exchange apparatus at or near a desired value.

This invention while generally concerned with such a system, more particularly involves an improved form of booster relay for imparting to such systems improved operating characteristics, more particularly with relation to improving the stability of such systems to eliminate hunting. Systems employing the invention herein disclosed are readily adjusted to meet varying operating conditions to vary the sensitivity of the control without causing a hunting action to occur, and to provide a system having a wide throttling range and a pressure change retard effect to improve the sensitivity without danger of hunting.

A description of one form of system in accordance with this invention will now be given. The heat exchange apparatus is diagrammatically illustrated as comprising a tank 1, having a heating coil 2 therein. Steam or other heating medium is supplied to this coil through the supply line 3, from any suitable source. This supply line includes a valve 4 which is operated by a diaphragm operated fluid pressure motor of which a number of forms are known in the art. The valve as illustrated is of the type which is normally held open by means of a spring 4', and which is closed against the action of the spring as the pressure builds up in the diaphragm chamber 4ª. The condensate exhaust connection 5 for the heating coil may be provided with a steam trap in accordance with usual practice. The tank 1 is provided with a supply connection 1ª through which the fluid to be heated, such as milk for example in the case of a pasteurizer may pass, and with an exhaust connection 1ᵇ through which the heated fluid is delivered from the tank.

Mounted within the tank at a suitable point is a thermometer bulb 6 which will be immersed in the fluid of the tank. This bulb is connected by a capillary tube 7 to a Bourdon spring 8, the free end 10 of which is connected by means of a link 11 to a lever 9 attached to the segment shaped valving member 12 which is pivotally mounted at 13. This valve member is positioned directly in front of a nozzle 15 of very small cross section formed in the nozzle plug 14. This nozzle plug has a small passage extending from the nozzle and connected to the air supply pipe 16 which extends to the chamber A within the upper portion of the casing or housing 17 of the booster relay. The upper portion 17 and the lower portion 17' of the housing are suitably secured together to form a casing for the relay parts. Secured between the housing parts is a plate or disc 21 which has a central aperture as shown. A ring 20 is likewise clamped between the housing parts to the inner edge of which is sealed the end of an expansible bellows 18. This bellows 18 is exposed to the changes in pressure conditions in the chamber A, of which the bellows forms a wall. The upper end of the bellows is closed as shown, and has secured thereto on its inner face a disc or plate 19 to which is threadedly secured a stem 22 which is locked in place by interengagement between the lock nut 23 and the hub 24 and the disc 19. A spring 25 engages the disc 19 at one end and rests upon the plate 21.

The housing is slotted at diametrically opposed points, as indicated at 26. Pivotally mounted upon the pin 28 which extends between the sides of the left hand slot is a lever 27. Similarly a lever 29 is pivotally mounted in pin 30, which extends between the sides of the right hand slot. The ends of the lever 30 are provided with upstanding ends 31 and 31' in which is journaled a shaft 34 which is threaded intermediate the ends thereof as shown. This shaft is provided with a pair of collars 33 which are secured thereto outside of the upstanding ends 31 and 31' so that the shaft may not move endwise when rotated. This shaft is provided with a knurled nut 34' by means of which it may be rotated. Mounted upon the shaft and engaging it by means of an internally threaded bore is a slidable fulcrum block 32 which is caused to slide back and forth upon the upper surface of the lever 29 as the shaft or rod 34 is rotated. This slide block is provided with a projection 32' upon which lever 27 rests. Encircling the shaft 34 and fixed to it is a sleeve 110 which limits the movement of the slide block 32 towards the right. The purpose of this sleeve, as used in one form of the invention, will be fully described in connection with the description of the operation of the apparatus.

A lower portion 17' of the housing is arranged to receive a ring 37 which clamps, by means of the screws 38 the periphery of a flexible diaphragm 36, forming the chamber 39 in conjunction with the lower part 17' of the relay housing. The diaphragm 36 is provided with a central aperture in which is locked the diaphragm button 41 in conjunction with the lock nut 42 and the clamp washers 40. This button has a longitudinal bore therethrough which opens into a transverse bore formed in the fulcrum head 35 upon which lever 29 rests.

The lower wall of the portion 17' of the housing is provided with an enlarged bore forming a chamber 50 which is closed at its lower end by means of a cap screw 48, and which converges into a similar bore opening into the chamber 39 and providing a seat for the valve 43. The upper end of the member providing the valve 43 likewise provides a valve 44 cooperating with the lower end of the longitudinal bore in the button 41. A spring 47 normally holds both valves seated. A passage 53 formed in the portion 17' of the housing opens into the chamber 50 and is connected by a pipe 51 to a source of fluid pressure such as an air reservoir maintained at a pressure of approximately 15 pounds per square inch. The passage 53 is provided with a branch connection 52 extending up through the side wall of both parts of the housing which opens into a chamber B, having a branch passage 61 opening into the chamber A. Chamber B also opens into an enlarged threaded recess which receives the threaded block 59 having a central threaded passage in which the needle valve 58 is adjustably mounted. The lower end of the needle valve cooperates at 57 with the upper end of passage 52 to restrict the flow of air therethrough. The advantage of this construction is that the block 59 can be backed away from its seat a short distance raising the needle valve away from the discharge end of passage 52, so that any dirt that may have accumulated will be blown either into the chamber B or through passage 61 into the large chamber A. When block 59 is reseated to form a seal the needle valve 57 is again accurately positioned without having disturbed its adjustment.

Secured to the lower portion 17' of the housing, or formed integral therewith, is a U-shaped yoke 80 which supports a pair of bellows 64 and 65, each of which is sealed thereto at one end, and closed at the other end by a wall to which the buttons or contact pieces 63 are secured. Lying between these buttons and in engagement therewith is the extension 62 of the arm 29. Formed in the bracket or yoke 80 is a passage 80ᵃ which is connected by pipe 82 to pipe 16. Its other end is connected by pipe 67 to chamber 68 in the restrictor or flow retard device, comprising a casing 76 having a central partition 77 to form the chamber 69 and another chamber 68. These chambers are closed by means of a cover 78. In the bottom of the casing is a passage 70 which is controlled by a needle valve 71 threadedly mounted in a block 74, which in turn is threadedly mounted in the casing. Chamber 69 is connected to the passage 70 at a point so that air or liquid in moving from chamber 68 to chamber 69, or vice versa, must flow through the restriction formed by the needle valve. Chamber 69 is connected by pipe 66 to the inside of bellows 64.

The operation of this apparatus will first be given without regard to the effect of the bellows 64 and 65 and the restrictor 76 being taken into consideration. It will be assumed that the parts are as shown in Figure 1, and that the temperature in tank 1 has been raised to just below the temperature it is desired to maintain in the heat exchange apparatus 1.

It will be further assumed that the pressure in the Bourdon spring or pressure responsive device 8 has positioned the valve member 12 by rotation in a counter clockwise direction about the pivot point 13 to a point where it is just beginning to restrict the discharge orifice of nozzle 15. This condition of the Bourdon spring 8 is, as is well known in the art, produced by the pressure of the fluid or gas in the bulb 6 and the capillary tube 7, being subject as it is to the temperature condition within the heat exchange apparatus.

It is also assumed that pressure fluid such as air is being supplied from any suitable source at approximately 15 pounds per square inch to pipe 51. A restricted quantity of the pressure fluid is flowing from pipe 51 through passage 52, past the restriction at the needle valve, through passage 61, into the chamber A, and from that chamber through pipe 16 and nozzle 15 to the atmosphere. Since the nozzle 15 is substantially uncovered the flow of pressure fluid prevents the building up of a pressure in the chamber A. At the same time pressure fluid is supplied from pipe 51 through passage 53 into chamber 50, where it accumulates at the pressure of the source under valve 43, which is of course closed. There is no pressure above atmospheric pressure on the diaphragm of the motor 4ᵃ so that this valve is open, admitting steam or the like to the heating coil 2, by way of pipe 3, and valve 4, from any suitable source.

Assuming next that the temperature in the heat exchange apparatus 1 increases a slight amount, this increase in temperature acting through the thermostat will increase the pressure in the Bourdon spring 8, causing the end 10 to move to the right, rotating valve 12 in a counterclockwise direction to slightly cover the discharge orifice of nozzle 15. This will restrict the flow of pressure fluid from the nozzle and will cause a slight back pressure to build up in chamber A. When this pressure has been built up sufficiently it will contract the bellows 18 against the resistance of spring 25, moving the stem 22 downwardly. As soon as this stem is in engagement with arm 27 it will be caused to rotate in a clockwise direction a small amount about pivot pin 28. Because this arm 27 rests upon the projection 32' of the slide block 32, its movement will be transmitted to lever 29 which will be rotated in a counterclockwise direction a small amount about its pivot point 30. However, since lever 29 rests upon the contact button 35, diaphragm 36 will be deflected downwardly, as will diaphragm button 41. Since this button 41 bears upon the valve member 44 it will likewise move downwardly against the resistance of spring 47 to unseat valve 43. Pressure fluid will then flow from chamber 50 into chamber 39, and thence through passage 54 and pipe 55 to the chamber of the fluid pressure motor 4ª. As this pressure builds up valve 4 will be partially closed restricting the flow of heating medium to the coil 2. During the time while the pressure is building up in chamber 39, valve 44 will be seated. At the same time the upward pressure upon diaphragm 36 is increasing, and when it has reached a value equal to the downward pressure caused by the bellows 18 acting through the lever system described above, the diagram will be statically balanced, and will by that time have returned to neutral or normal position. However, as the diaphragm returns to neutral position valve 43 will return to seated position under the action of spring 47, and the pressure chamber 50. Valve 44 will also remain seated throughout this period.

From the above explanation it will be apparent that the diaphragm 36 will regain its neutral position when the pressure in chamber 39 is such that the total lifting force on the underside of the diaphragm balances the total downward force exerted on the diaphragm button from above. This upward force is determined by the pressure in the chamber 39 and the effective area of diaphragm 36. The downward force in turn is determined by the pressure in chamber A, the effective area of bellows 18, and the compounding effect produced by the arms 27 and 29. The compounding or multiplying effect in turn depends upon the ratio of the length from pivot pin 28 to the point of contact between the projection 32' and lever 27, and the distance from that same point to the pivot pin 30. Therefore, for any given ratio between these distances the pressure in chamber 39 will always have a definite relationship to the pressure in chamber A.

Assume now that the partial closing of the control valve 4 has cut down the supply of steam so that the temperature in the heat exchange apparatus 1 becomes constant. At this time the entire control system is statically balanced, the fluid pressure in chambers A and 39 and the chamber of the diaphragm motor 4ª will be constant, whereby the entire system is in equilibrium. The only pressure fluid then being used will be the small amount escaping from the restricted discharge nozzle 15. Assuming, however, that the partial closing of the control valve 4 has restricted the supply of steam to the heating coil 2 to a point so that the temperature in the heat exchange apparatus falls slightly, spring 8 will obviously contract and move the valve member 12 away from orifice 15. The pressure in chamber A then falls. At this point it may be noted that the discharge area of orifice 15 is of such an area than when the nozzle 15 is not restricted all air supplied through the needle valve 57 may escape through the nozzle 15 without building up any noticeable pressure in chamber A. The falling of the pressure in chamber A will reduce the downward pressure on diaphragm 36, which being no longer balanced, will deflect upwardly unseating valve 44 (it will be remembered that valve 43 is seated). The fluid pressure in chamber 39 may then escape to atmosphere through the passages in the diaphragm button 41 until the diaphragm 36 returns to normal position and is statically balanced. That is, until the upward pressure on the diaphragm equals the reduced downward pressure thereon from bellows 18. At this time valve 44 is again closed. It is evident that the pressure in chamber 39 bears a definite relation to the pressure in chamber A, and that this relationship is maintained whether the pressure in chamber A is rising, falling, or static.

Upon consideration of the above description and the construction of the device it will be apparent that there must be a definite change in the temperature of the heat exchange apparatus 1 before the spring 8 will cause the valve 12 to rotate sufficiently to fully cover or uncover nozzle 15, and likewise that the amount the nozzle is covered or uncovered will be proportional to the amount of temperature change by the bulb 6. Also, it is apparent that the pressure in chamber A is proportional to the amount that nozzle 15 is covered. Furthermore, as explained above, the pressure in chamber 39 and in the diaphragm chamber of fluid pressure motor 4ª is proportional to the pressure in chamber A. Therefore, the pressure in chamber 39 will be proportional to the temperature change required to cause spring 8 to rotate valve 12. To state the same thing another way, the temperature in the heat exchange apparatus 1 must deviate a certain amount from the set control point before the control mechanism can build up or exhaust enough pressure fluid in or from chamber 39 to fully close or open control valve 4. The amount of temperature change required to produce full travel of the control valve 4 is known as the "throttling range" of the control mechanism. In apparatus of this type it is known that the "throttling range" should be capable of a fairly wide adjustment to meet various operating conditions. In some cases it may be required that the control valve 4 make its full travel for a one degree change in temperature in the heat exchange apparatus, while in other cases such sensitivity may result in "hunting", and the "throttling range" should therefore be, for example, ten degrees to produce smooth control.

In prior known control apparatus of this type the "throttling range" is usually varied by changing the amount that the pressure spring 8 must deflect in order to fully uncover the discharge nozzle 15. The mechanisms which are utilized to secure this type of throttling adjustment are well known, and need not be described here in order to understand the new mechanism herein disclosed for varying the throttling range of such control mechanism.

With the present apparatus the "throttling range" of the control mechanism is varied by changing the boosting effect of the pilot or relay valve. As previously stated, for a given effective area of diaphragm 36, the relation of the pressure in chamber 39 to that in chamber A will depend upon the position of the projection 32', that is the ratio of the distances from the pivot points 28 and 30 to the contact point of lever 27 with the projection 32'. With the projection 32' in the position illustrated in Figure 1, the boosting effect of the relay will be the greatest. That is a small pressure in chamber A will result in a considerably higher pressure in chamber 39. When the slide block 32 is as far to the right as it will go (sleeve 110 omitted), the boosting effect will be small, that is the pressure in chamber 39 will approximately equal the pressure in chamber A.

In practical applications of this invention it is preferred to proportion the bellows 18, diaphragm 36 and arms 27 and 29 so that in the position of the slide block as shown in Figure 1, each unit increase of pressure in chamber A will result in an increase of six units of pressure in chamber 39, and when slide block 32 is at the extreme right a unit increase of pressure in chamber A will result in the same unit increase of pressure in chamber 39. To state it differently, in the first case the boosting effect is six to one, but in the second case the boosting effect is one to one. Various ratios may be secured intermediate these extremes by intermediate positioning of slide block 32. It will of course be apparent that the slide block may be moved back and forth by rotating knob 34' in either direction.

Let it now be assumed that the fluid pressure supply in pipe 51 is maintained constant at 15 pounds per square inch, and that the control valve 4 is wide open with zero pounds per square inch in the diaphragm chamber of motor 4ª, and fully closed with 12 pounds per square inch pressure therein. Let it also be assumed that a change of temperature of six degrees at the bulb 6 is required in order that the spring 8 will cause the valve 12 to restrict nozzle 15 sufficiently to build up a pressure of 12 pounds per square inch in chamber A. If then slide block 32 is set at the extreme right for a one to one boosting ratio, a six degree change in temperature would build up 12 pounds per square inch in chamber A, and this pressure will in turn produce a 12 pounds per square inch pressure in chamber 39 and in the diaphragm chamber of motor 4ª. Under these conditions the "throttling range" would be six degrees. If now slide block 32 is moved to the extreme left hand position corresponding to a boosting ratio of six to one in order to build up a pressure of 12 pounds per square inch in chamber 39, it will only be necessary to build up a pressure of two pounds per square inch in chamber A. Therefore, only a temperature change of one degree is necessary to produce a full travel of the control valve 4, and the "throttling range" is then one degree.

The operation of the apparatus will now be described as modified by the presence of bellows 64 and 65 and the restrictor or retarding device 76. It is well known in this art that in some applications of control mechanism of this type a very sensitive control will cause a "hunting" action of the control valve 4, which in turn will set up surges in the operation of the heat exchange apparatus. "Hunting" is particularly likely to occur when a "process lag" exists in the system under control. Decreasing the sensitivity of the control mechanism will decrease the "hunting" action, but this will also result in the control drifting away from or deviating from the desired set point with a change in load on the control valve. In processes where a time lag exists and where such drifting is not desirable the pressure change retard mechanism in combination with the previously described apparatus is employed in accordance with this invention.

In describing the operation it will be assumed that the areas of bellows 64 and 65 are approximately the same, and that they have approximately the same deflection for a given pressure therein. It will be noted that the contact buttons 63 bear upon the extension 62 of lever 29 in the same line of action. The distance between this line of action and the pivot pin 30 and the effective area of bellows 65 are selected so that when the slide block 32 is near its extreme left hand position equal pressures in chamber A and bellows 65 will produce equal but opposite rotative effects upon arm 29 about the pivot point 30, providing there is no pressure in bellows 64.

In other words when block 32 is properly positioned equal pressure in chambers A and bellows 65 will produce no rotative effect upon arm 29 about pivot point 30, but if the pressure in chamber A is greater than the pressure in bellows 65, a counterclockwise rotation of arm 29 will result, and conversely, if the pressure in bellows 65 is greater than the pressure in chamber A, clockwise rotation of arm 29 will result. Since chamber A and bellows 65 are connected together by pipe 82, the same pressure will always occur in both chambers. Of course, any pressure in bellows 64 will tend to depress arm 29.

In describing the operation of the complete apparatus as illustrated in Figure 1, we will assume that the control mechanism is maintaining the temperature in the heat exchange apparatus constant and that the heat load is constant. Valve member 12 will be partially covering nozzle 15 to hold a back pressure of say 4 pounds per square inch in chamber A. Spring 25 is so selected that 2 pounds per square inch pressure must be built up in chamber A before stem 22 will exert any force on arm 27. The pressure in chamber 68 and bellows 65 is the same as the pressure in chamber A. 4 pounds per square inch pressure in chamber 68 will have caused a slow seepage of pressure fluid passed the needle valve 71 into chamber 69, pipe 66, and bellows 64 until the pressure therein is the same as the pressure in bellows 65. In other words the pressure in chamber A, bellows 64 and 65, and chambers 68 and 69 is the same. The pressure in chamber A will therefore operate the relay as previously described to build up a pressure in chamber 39 and in the diaphragm chamber of the motor 4ª. Since only the 2 pounds per square inch pressure of the 4 pounds per square inch pressure in chamber A is effective (because of spring 25) there will be a pressure of 8 pounds in chamber 39 if the relay is adjusted so that its boosting effect is in the ratio of four to one. It is assumed that this pressure is sufficient to close control valve 4 just enough so that the steam supplied through it is exactly the correct amount to maintain the temperature constant in the heat exchange apparatus 1. The entire system is then in equlibrium.

Let us now suppose that the rate of flow of cold fluid through the heat exchange apparatus by way of the supply pipe 1ª, and the discharge pipe 1ᵇ is suddenly increased. The first effect on the apparatus will be a drop in temperature of bulb 6, which in turn will result in the contraction of spring 8, further uncovering nozzle 15 and decreasing the pressure in chamber A. Assuming that the pressure decrease in chamber A is 1½ pounds per square inch this decrease would ordinarily cause a decrease in pressure in the diaphragm chamber of motor 4ª of 6 pounds per square inch (remembering the boosting relation of four to one). However, the pressure in bellows 65 decreases at the same rate as the pressure in chamber A, but the pressure in bellows 64 can decrease no faster than the pressure can equalize between bellows 64 and 65 through the restrictor 76. Therefore, as long as the pressure in bellows 64 is greater than the pressure in bellows 65, bellows 64 will exert a downward force on arm 29, which will prevent diaphragm 36 from suddenly lifting when the pressure is decreased in chamber A. Therefore, the pressure in the diaphragm chamber of motor 4ª and in chamber 39 is prevented from suddenly dropping.

The rate at which the pressure in chamber 39 drops will be proportional to the rate at which the pressure equalizes in the bellows 64 and 65. However, when the pressure has equalized therein the pressure in chamber 39 will be proportional to the decrease in pressure in chamber A. In other words, although the ultimate boosting effect of the relay is four to one, it is only attained by gradually changing from zero to that ratio at a rate proportional to the equalization of pressure between the bellows 64 and 65 and the result is that "hunting" of the control valve 4 is prevented. It is obvious that had less cold fluid been admitted to the heat exchange apparatus instead of more the temperature surrounding bulb 6 would have gone up, valve 12 would have further covered nozzle 15, and additional pressure would have quickly built up in chamber A, and bellows 65. However, the pressure in chamber 39 could not have built up at a rate faster than the pressure in bellows 64 and 65 could equalize.

In some applications of this system where the rate of pressure equalization between the bellows 64 and 65 should be very slow a liquid may be employed in the restrictor 76 instead of air, since the flow of a liquid through an orifice is much slower than that of air or gas with the same pressure differential. Therefore, when very slow equalization is required some suitable liquid such as oil is employed in the chambers 68 and 69. The rising and falling of the level of the liquid in these chambers will increase and decrease the pressure of the air trapped in an obvious manner. In both cases of liquids and gases the rate of pressure equalization may also be controlled by adjusting the needle valve 71.

In the above explanations it was assumed that the slide block 32 was so positioned that the same pressure in chamber A and bellows 65 would produce no turning movement on arm 29.

Let us now assume that the slide block 32 is moved to the left from this position, which may be termed a neutral position. Counterclockwise movement of arm 62, due to pressure in chamber A would be increased, but the clockwise movement due to pressure in bellows 65 would remain the same. Therefore, valve 43 would open to build up a pressure in chamber 39 sufficient to balance the resultant counterclockwise moment on arm 29. That is with slide block 32 to the left of its neutral position there will be a small but instant increase in the pressure in chamber 39 for an increase in the pressure in chamber A. Then as the pressure equalizes between the bellows 64 and 65 additional pressure will build up slowly in chamber 39 to a value determined by the pressure in chamber A and the boosting effect of the relay dependent upon the seating of slide block 32. Thus, with these adjustments, a quick small response of the control valve 4 is obtained, followed by a gradual further response. It will be understood that if the pressure in chamber A is suddenly dropped that there will be a quick small drop of pressure in chamber 39, followed by a gradual further drop.

The slide block 32 for all normal uses should not be moved to the right of its control position. When so moved an effect on the control valve opposed to that normally desired will result. Assume that the pressure in chamber A and bellows 64 and 65 is equalized, and that the pressure in chamber A and bellows 65 is suddenly decreased, the pressure in chamber 39 should decrease, but if the slide block is to the right of its neutral position the excess pressure in bellows 64 will cause valve 43 to open, causing a rise in pressure in chamber 39 instead of a decrease, which condition exists until the pressure in bellows 64 and 65 equalizes, at which time the pressure in chamber 39 will drop to a value determined by the boosting ratio of the relay. Therefore, for all normal uses of this device the sleeve 110 is provided of such length as to prevent movement of the slide block 32 to the right of its neutral position.

From the above description of the system employing the bellows 64 and 65 and the restrictor 76, it will be clear that for any sudden change in load the temperature in the heat exchange apparatus will momentarily deviate from the set control point, but that as soon as the pressures in the bellows 64 and 65 equalize the temperature will again be back within the "throttling range" as determined by the boosting ratio of the relay. Thus an extremely sensitive ultimate control is obtained without the "hunting" action which would otherwise result.

In order that the "throttling range" be narrow it is desirable that the boosting effect of the relay be large when the slide block 32 is in its neutral position, as determined by the sleeve 110. Otherwise if the boosting effect is low, the slide block 32 would have to be moved some distance to the left of its neutral position in order to obtain a large boosting effect and a narrow "throttling range". As has been pointed out, moving block 32 to the left of its neutral position results in immediate response of the control valve with a change in pressure chamber A, and the further the block 32 is moved to the left, the greater will be this response. Therefore, at a high boosting ratio the benefit of the pressure retard mechanism would be largely lost and "hunting" might result. In some applications of control apparatus of this type there is required the combination of a wide "throttling range" plus a pressure change retard effect on the diaphragm of the control valves 4.

In order to obtain this combination of wide "throttling range" and retard control valve action the slightly different arrangement of relay and retard device is employed as shown in Figure 4. With this arrangement the connection 82 is removed and in its place passage 80ª is connected to pipe 55 by pipe 89. Otherwise the apparatus and connections are the same. With this arrangement the pressure in bellows 65 will be the same as the pressure in chamber 39, and the diaphragm chamber of the valve motor 4ª.

The result is that with a sudden increase of pressure in chamber A inlet valve 43 will immediately open to build up pressure in chamber 39 and bellows 65. The inlet valve 43 will close when the upward force of diaphragm 36 plus the upward force of bellows 65, both acting on lever 29, equals the downward force produced by the pressure in chamber A. Obviously the pressure in chamber 39 will be much lower than it would be without the aid of bellows 65. As the pressure equalizes in bellows 64 and 65 the clockwise movement of lever 29 will be decreased and additional pressure must build up in chamber 39 and bellows 65 to balance it. Thus, when the pressure in the bellows 64 and 65 is fully equalized, the pressure in chamber 39 will depend only upon the pressure in chamber A and the position of slide block 32.

Thus, with the arrangement of Figure 4 there will of course be a quick partial response of the control valve 4 with changes in pressure in chamber A built up of retarded response until the total response is obtained as determined by the position of slide block 32. In this case the sleeve 110 is omitted since the slide block 32 may be set in position within the limits of shaft 34 and a sudden drop of pressure in chamber A cannot cause the pressure in chamber 39 to momentarily increase. In other words, with these connections there is no neutral point for the slide block 32 and the boosting ratio can be set anywhere within the physical limits of the relay by properly positioning the slide block 32.

It will also be evident to those skilled in the art that the pipes 82 and 89 may be so arranged that the interior of bellows 65 may be placed in communication with either chamber 39 or bellows 64 or 65 to adapt the apparatus to any desired mode of control most suited to a particular application of the invention. It is also apparent that sleeve 110 may be made removable at will, since it is not needed when bellows 65 is directly connected to chamber 39.

It is also apparent to those skilled in the art that the particular type of restrictor 76 disclosed may have substituted for it other equivalent structures known in the art.

While this invention has been described as applied to a temperature control system it is apparent to those skilled in the art that it is equally applicable to any type of control system where a deviation from the control point can be made to cause valve member 12 to vary its position with respect to orifice 15 and where the controlled pressure in chamber 39 can be utilized to operate means to correct the deviations from the control point.

We do not therefore desire to be strictly limited to the disclosure as given for purposes of illustration, but rather to the scope of the appended claims.

What we seek to secure by United States Letters Patent is:

1. In an apparatus as described the combination comprising a heat exchange apparatus, valve means for controlling the supply of heating or cooling medium to said apparatus, a fluid pressure motor for actuating said valve means, a fluid pressure supply connection to said motor, a valve in said connection, a booster relay for controlling said valve comprising a pair of opposed pressure responsive means acting upon a compound leverage system, means responsive to the temperature or pressure conditions within the heat exchange apparatus for controlling the pressure acting upon one of said pressure responsive means the other pressure responsive means being subject to fluid pressure controlled by the valve in said connection, a second pair of pressure responsive means acting on one of the levers of the compound leverage system in opposite directions, a connection to one of the second pair of pressure responsive means from the first pressure responsive means of the first pair, said connection also extending to the other pressure responsive means of the second pair, and means for retarding the flow of pressure fluid from the first to the second pressure responsive means of the second pair.

2. In an apparatus as described the combination comprising a heat exchange apparatus, valve means for controlling the supply of heating or cooling medium to said apparatus, a fluid pressure motor for actuating said valve means, a fluid pressure supply connection to said motor, a valve in said connection, a booster relay for controlling said valve comprising a pair of opposed pressure responsive means acting upon a compound leverage system, means responsive to the temperature or pressure conditions within the heat exchange apparatus for controlling the pressure acting upon one of said pressure responsive means, the other pressure responsive means being subject to fluid pressure controlled by the valve in said connection, a second pair of pressure responsive means acting in opposite directions on one of the levers of the compound leverage system, a connection from the second pressure responsive means of the first pair to one of the pressure responsive means of the second pair, and extending to the other pressure responsive means of the second pair, and means in the connection between the pressure responsive means of the second pair for retarding the flow of pressure fluid therebetween.

3. A booster relay of the type described comprising a hollow housing, a pair of diaphragms dividing said housing into two sealed chambers, a compound leverage system pivotally mounted on the housing between said diaphragms, means mounted on each of said diaphragms and engaging the compound leverage system to apply loading thereto in opposite directions, a fluid supply connection to each of said chambers, and a valve in one of said connections actuated by the diaphragm of the adjacent chamber for controlling the supply of pressure fluid thereto.

4. A booster relay of the type described comprising a hollow housing, a pair of diaphragms dividing said housing into two sealed chambers, a compound leverage system pivotally mounted on the housing between said diaphragms, means mounted on each of said diaphragms and engaging the compound leverage system to apply loading thereto in opposite directions, a fluid supply connection to each of said chambers, one of said chambers having an exhaust port, and valves for controlling the pressure fluid supply to that chamber and the exhaust port, said valves being actuated by the diaphragm of that chamber.

5. A booster relay of the type described comprising a hollow housing, a pair of diaphragms dividing said housing into two sealed chambers, a compound leverage system pivotally mounted on the housing between said diaphragms, means mounted on each of said diaphragms and engaging the compound leverage system to apply loading thereto in opposite directions, a fluid supply connection to each of said chambers, the means mounted on one of said diaphragms having an exhaust passage therethrough, and a valve in the connection to the chamber formed by that diaphragm for controlling the supply of fluid pressure to that chamber and the exhaust of fluid pressure from that chamber through the exhaust passage.

6. A booster relay of the type described comprising a hollow housing, a pair of diaphragms dividing said housing into two sealed chambers, a compound leverage system pivotally mounted on the housing between said diaphragms, means mounted on each of said diaphragms and engaging the compound leverage system to apply loading thereto in opposite directions, a fluid supply connection to each of said chambers, a valve in one of said connections actuated by the diaphragm of the adjacent chamber for controlling the supply of pressure fluid thereto, and means for varying the effective moment of the compound leverage system.

7. A booster relay of the type described comprising a hollow housing, a pair of diaphragms dividing said housing into two sealed chambers, a compound leverage system pivotally mounted on the housing between said diaphragms, means mounted on each of said diaphragms and engaging the compound leverage system to apply loading thereto in opposite directions, a fluid supply connection to each of said chambers, one of said chambers having an exhaust port, valves for controlling the pressure fluid supply to that chamber and the exhaust port, said valves being actuated by the diaphragm of that chamber, and means for varying the effective moment of the compound leverage system.

8. A booster relay of the type described comprising a hollow housing, a pair of diaphragms dividing said housing into two sealed chambers, a compound leverage system pivotally mounted on the housing between said diaphragms, means mounted on each of said diaphragms and engaging the compound leverage system to apply loading thereto in opposite directions, a fluid supply connection to each of said chambers, the means mounted on one of said diaphragms having an exhaust passage therethrough and a valve in the connection to the chamber formed by that diaphragm for controlling the supply of fluid pressure to that chamber and the exhaust of fluid pressure from that chamber through the exhaust passage, and means for varying the effective moment of the compound leverage system.

9. In a control system for controlling an apparatus, a pressure fluid motor for operating a control device, a pressure fluid supply connection to the motor, a valve for controlling the flow of pressure fluid to the motor, a pair of pressure responsive devices, a leverage system upon which said devices act in opposition, one of said devices being subject to variations of pressure in said connection, a pressure fluid supply pipe, means subject to a variable condition in the apparatus for varying the pressure in said pipe, the other device being operated by variations of pressure in said pipe, a second pair of pressure responsive devices acting on said leverage system in opposition, a connection from said pipe to each of said second pair of devices, and means for varying the rate of response of one of said second pair of devices.

10. In an apparatus as described the combination comprising a heat exchange apparatus, valve means for controlling the supply of heating or cooling medium to said apparatus, a fluid pressure motor for actuating said valve means, a fluid pressure supply connection to said motor, a valve in said connection, a booster relay for controlling said valve comprising a pair of opposed pressure responsive means acting upon a compound leverage system, means responsive to the temperature or pressure conditions within the heat exchange apparatus for controlling the pressure acting upon one of said pressure responsive means, the other pressure responsive means being subject to fluid pressure controlled by the valve in said connection, a second pair of pressure responsive means acting on one of the levers of the compound leverage system in opposite directions, a connection to one of the second pair of pressure responsive means from one of the first pair of pressure responsive means, said connection also extending to the other pressure responsive means of the second pair, and means for retarding the flow of pressure fluid from the first to the second pressure responsive means of the second pair.

ELMER H. HAMMOND.
RUDOLF BECK.